United States Patent
Yoshikawa et al.

(10) Patent No.: US 7,268,928 B2
(45) Date of Patent: Sep. 11, 2007

(54) PHOTO SCANNER AND IMAGE FORMING DEVICE

(75) Inventors: Masanori Yoshikawa, Neyagawa (JP); Hideo Hirose, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/506,363

(22) PCT Filed: May 2, 2003

(86) PCT No.: PCT/JP03/05643

§ 371 (c)(1),
(2), (4) Date: Sep. 2, 2004

(87) PCT Pub. No.: WO03/098318

PCT Pub. Date: Nov. 27, 2003

(65) Prior Publication Data

US 2005/0157361 A1 Jul. 21, 2005

(30) Foreign Application Priority Data

May 15, 2002 (JP) .............................. 2002-140673

(51) Int. Cl.
*G02B 26/08* (2006.01)

(52) U.S. Cl. ..................................... 359/205; 359/208
(58) Field of Classification Search ................ 359/196, 359/202, 205, 208, 212, 214, 859, 857, 216
See application file for complete search history.

(56) References Cited

U.S. PATENT DOCUMENTS

| 5,751,464 | A | * | 5/1998 | Yoshikawa et al. | ......... 359/208 |
| 6,049,409 | A | * | 4/2000 | Nakaie | ...................... 359/216 |
| 6,091,533 | A | | 7/2000 | Iizuka | |
| 6,198,563 | B1 | * | 3/2001 | Atsuumi | ..................... 359/208 |

FOREIGN PATENT DOCUMENTS

| JP | 8-94953 | 4/1996 |
| JP | 10-239608 | 9/1998 |
| JP | 11-30710 | 2/1999 |
| JP | 11-149054 | 6/1999 |
| JP | 2001-13441 | 1/2001 |

* cited by examiner

*Primary Examiner*—Euncha P. Cherry
(74) *Attorney, Agent, or Firm*—Hamre, Schumann, Mueller & Larson, P.C.

(57) ABSTRACT

A first reflecting optical element (7) and a second reflecting optical element (51) are provided, and the second reflecting optical element (51) is disposed so as to reflect incident light to be incident on the first reflecting optical element (7) and reflected light from the first reflecting optical element, and thus a small-sized optical scanner can be obtained.

18 Claims, 7 Drawing Sheets

PHOTO SCANNER AND IMAGE FORMING DEVICE

TECHNICAL FIELD

The present invention relates to an optical scanner used in a laser beam printer, a laser facsimile, a digital copier or the like and an image forming apparatus.

BACKGROUND ART

Most types of optical scanners used in laser beam printers and the like have a configuration including a semiconductor laser as a light source, a first image forming optical system that linearly focuses a light beam from the light source on an optical deflector so as to compensate for the tilt of a deflection surface of the optical deflector, a polygon mirror as the optical deflector, a second image forming optical system that allows a uniform spot with a constant speed to be formed on a surface to be scanned, a scanning starting signal detector that detects a light beam scanned by the optical deflector, and a detecting optical system that condenses a light beam from the light source onto the scanning starting signal detector.

The second image forming optical system in a conventional optical scanner is configured of a so-called f-θ lens that is made up of a plurality of large-sized glass lenses, which has been a cause of difficulty in reducing size and high cost. With respect to this problem, in recent years, as disclosed in JP 8(1996)-94953 A and JP11(1999)-30710 A, optical scanners for achieving size and cost reduction that use a curved surface mirror as the second image forming optical system have been proposed.

However, with regard to each of the above optical scanners that have been proposed, though it is explained that ideally, a light beam from the curved surface mirror is guided directly to an image plane, since the light beam is reflected off the curved surface mirror at a small reflection angle, practically, in order for the light beam to be guided to a photosensitive drum constituting a surface to be scanned, the following configuration is required. That is, an optical path of an increased length is provided, and a polygon mirror, the curved surface mirror, and the photosensitive drum are disposed so that a distance between the polygon mirror and the curved surface mirror and a distance between the curved surface mirror and the photosensitive drum are increased. Because of this, particular schemes have been required to reduce the size of the scanners.

DISCLOSURE OF THE INVENTION

In view of the above-mentioned problems, it is the first object of the present invention to provide an optical scanner that has a simple configuration and allows effective use of its space so as to reduce the size of the scanner, and an image forming apparatus. Further, the second object of the present invention is to provide an optical scanner that includes a curved surface mirror of a shape that provides relative ease of processing and measurement, and an image forming apparatus. Moreover, the third object of the present invention is to provide an optical scanner that has excellent optical performance with no wavelength dependency, and an image forming apparatus.

In order to achieve the above-mentioned objects, an optical scanner according to the present invention includes first and second reflecting optical elements. In the optical scanner, the second reflecting optical element is disposed so as to reflect incident light to be incident on the first reflecting optical element and reflected light from the first reflecting optical element.

Furthermore, an image forming apparatus according to the present invention uses the above-mentioned optical scanner according to the present invention.

BEST MODE FOR CARRYING OUT THE INVENTION

Figure 1:
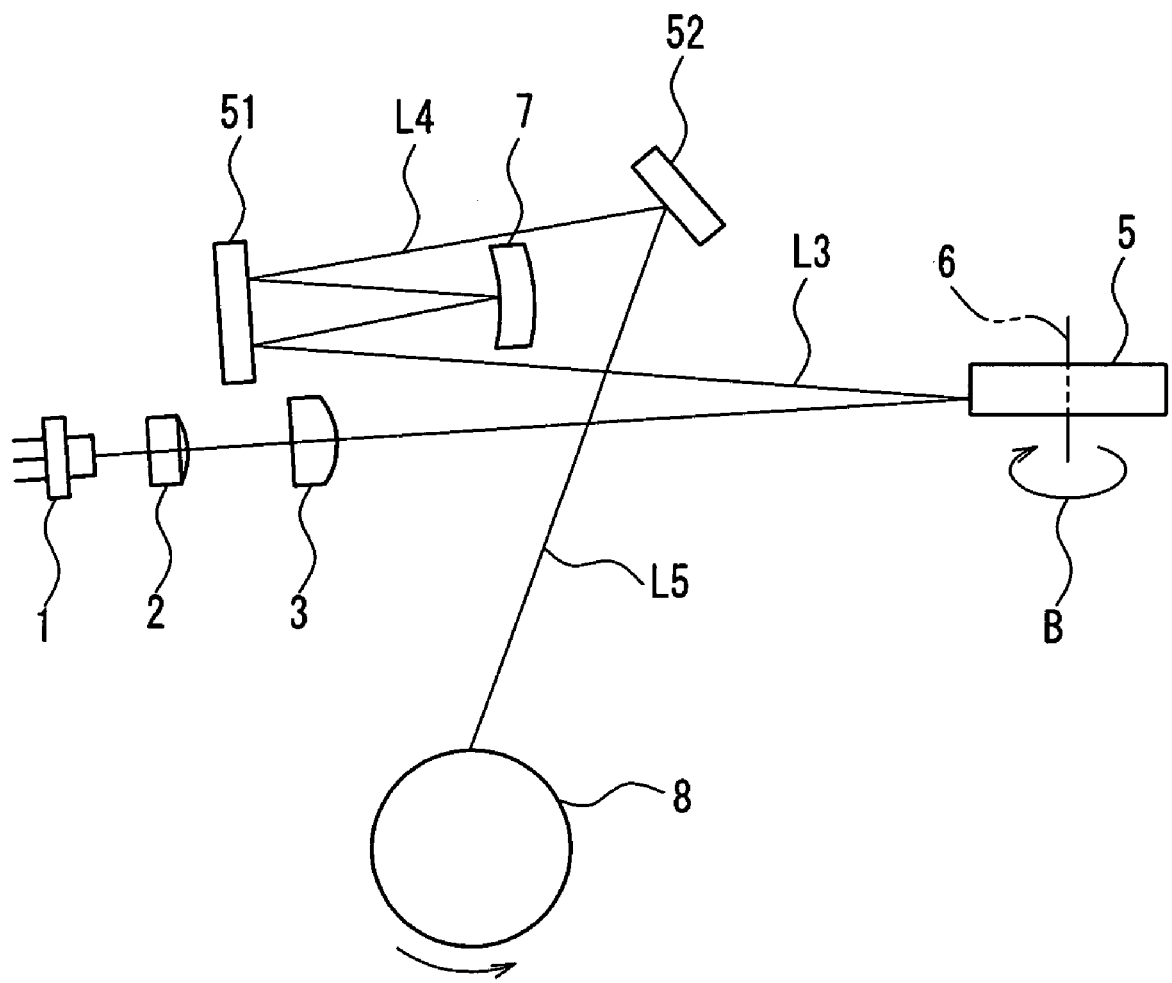
FIG. 1 is a cross-sectional view of an optical scanner according to Embodiment 1 of the present invention, which is cut on a plane that includes a scanning center axis and is parallel to a sub-scanning direction.

According to the optical scanner of the present invention, the first and second reflecting optical elements are provided, and the second reflecting optical element is disposed so as to reflect incident light to be incident on the first reflecting optical element and reflected light from the first reflecting optical element, and thus a small-sized optical scanner can be obtained.

Furthermore, the image forming apparatus according to the present invention includes the above-mentioned optical scanner according to the present invention, and thus a small-sized image forming apparatus can be obtained.

Preferably, the above-mentioned optical scanner according to the present invention further includes a light source part, an optical deflector that scans a light beam from the light source part, and a first image forming optical system that is disposed between the light source part and the optical deflector and allows a linear image to be formed on a deflection surface of the optical deflector, and has the following configuration. That is, the first reflecting optical element is formed of a curved surface mirror, and is disposed between the optical deflector and a surface to be scanned and constitutes a second image forming optical system. Further, the first image forming optical system, the optical deflector, and the second image forming optical system are disposed respectively in different positions in a sub-scanning direction so that a light beam from the first image forming optical system is incident obliquely relative to a plane that includes a normal line to the deflection surface of the optical deflector and is parallel to a main scanning direction, and so that a light beam from the optical deflector is incident obliquely relative to a plane that includes a normal line at a vertex of the curved surface mirror and is parallel to the main scanning direction (hereinafter, referred to as a "YZ plane").

Preferably, the first reflecting optical element is formed of a curved surface mirror, and the curved surface mirror has a shape symmetrical with respect to a plane that includes the normal line at the vertex of the curved surface mirror and is perpendicular to the main scanning direction (hereinafter, referred to as an "XZ plane").

Preferably, the second reflecting optical element reflects the incident light to be incident on the first reflecting optical element and the reflected light from the first reflecting optical element by using a common surface of the second reflecting optical element.

Herein, preferably, the first reflecting optical element is formed of a curved surface mirror, and when a distance between the first reflecting optical element and the second reflecting optical element along the normal line at the vertex of the curved surface mirror is indicated as l, an angle formed by a center axis of the incident light to be incident on the first reflecting optical element and the YZ plane as θM, a width of the incident light on the first reflecting optical element in the sub-scanning direction as dm, a width of the incident light to be incident on the first reflecting optical element on the second reflecting optical element in the sub-scanning direction as di, and a width of the reflected light from the first reflecting optical element on the second reflecting optical element in the sub-scanning direction as do, the following conditional expression (1) is satisfied:

$$\frac{dm}{2} + 1 \leq 2l \tan \theta M \leq \frac{di}{2} + \frac{do}{2} + 2 \quad (1)$$

As an alternative, preferably, the first reflecting optical element is formed of a curved surface mirror, and when a distance between the first reflecting optical element and the second reflecting optical element along the normal line at the vertex of the curved surface mirror is indicated as l, a distance between the first reflecting optical element and the second reflecting optical element along the center axis of the incident light to be incident on the first reflecting optical element as Lmi, a distance between the first reflecting optical element and the second reflecting optical element along a center axis of the reflected light from the first reflecting optical element as Lmo, an angle formed by the center axis of the incident light to be incident on the first reflecting optical element and the YZ plane as θM, a width of the incident light on the first reflecting optical element in the sub-scanning direction as dm, a distance from the deflection surface of the optical deflector to the vertex of the first reflecting optical element as L, and a distance from the vertex of the first reflecting optical element to the surface to be scanned as D, the following conditional expression (1) is satisfied:

$$\frac{dm}{2} + 1 \leq 2l \tan \theta M \leq \frac{di}{2} + \frac{do}{2} + 2 \quad (1)$$

where di and do are approximated by the following expressions (2) and (3), respectively:

$$di = dm \times \frac{L - Lmi}{L} \quad (2)$$

$$do = dm \times \frac{D - Lmo}{D} \quad (3)$$

Preferably, the first reflecting optical element is disposed in a space interposed between incident light to be incident on the second reflecting optical element and reflected light from the second reflecting optical element.

Preferably, the above-mentioned optical scanner according to the present invention further includes a third reflecting optical element that reflects the reflected light from the second reflecting optical element, and the first reflecting optical element is disposed in a space interposed among the incident light to be incident on the second reflecting optical element, the reflected light from the second reflecting optical element, and reflected light from the third reflecting optical element.

Preferably, the first reflecting optical element has a shape that permits compensation for a curve of a scanning line that occurs due to oblique light incidence.

Preferably, the curved surface mirror has a skew shape in which a normal line at each of points other than the vertex on a generatrix that is a curved line where a surface of the curved surface mirror intersects with the YZ plane is not included in the YZ plane.

Hereinafter, the present invention will be described by way of embodiments with reference to the appended drawings.

EMBODIMENT 1

FIG. is a cross-sectional view showing an embodiment of the optical scanner according to the present invention, which is cut on a plane that includes a scanning center axis and is parallel to a sub-scanning direction. Further, FIG. 2 is a schematic plane view showing the embodiment of the optical scanner shown in FIG. 1. In FIG. 2, optical elements such as a plane mirror and the like are represented by their reflecting surfaces indicated by alternate long and short dashed lines for the sake of simplicity.

Figure 2:
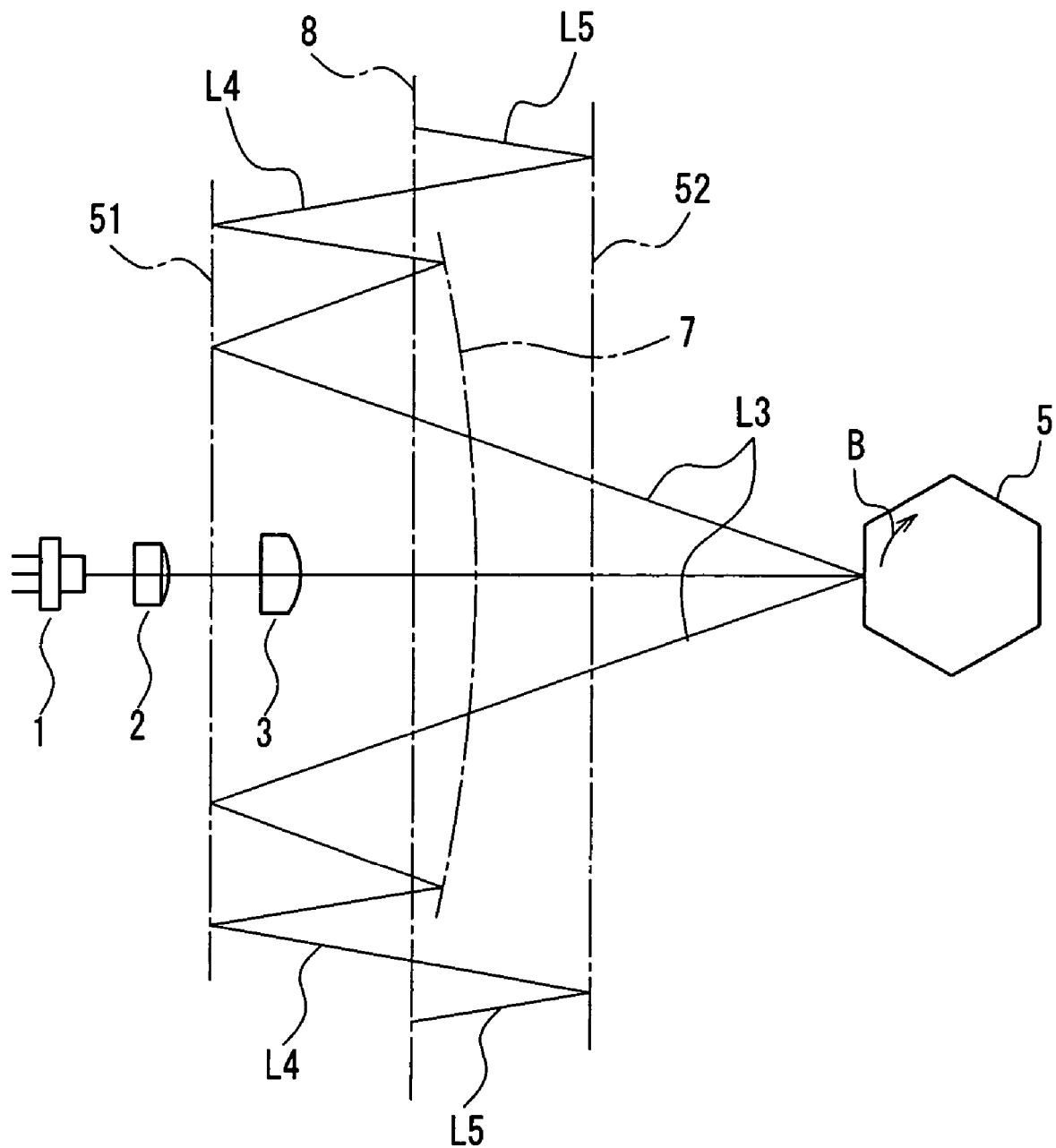
FIG. 2 is a schematic plane view of the optical scanner according to Embodiment 1 of the present invention.

In each of FIGS. 1 and 2, reference numeral 1 denotes a semiconductor laser as a light source part. Further, reference numerals 2 and 3 denote an axial symmetric lens and a cylindrical lens that has a refractive force only in the sub-scanning direction, respectively, and the axial symmetric lens 2 and the cylindrical lens 3 constitute a first image forming optical system. Reference numerals 5 and 6 denote a polygon mirror as an optical deflector and a rotation center axis for the polygon mirror 5, respectively. The polygon mirror 5 includes a plurality of deflection surfaces (reflecting surfaces) of the same shape around the rotation center axis 6. Reference numerals 7 and 8 denote a curved surface mirror as a first reflecting optical element and a photosensitive drum that is a surface to be scanned, respectively. The curved surface mirror 7 constitutes a second image forming optical system. Reference numerals 51 and 52 denote a plane mirror as a second reflecting optical element and a plane mirror as a third reflecting optical element, respectively. The plane mirror 51 is disposed so as to reflect a light beam from the polygon mirror 5 toward the curved surface mirror 7, and so as to reflect a reflected light beam from the curved surface mirror 7 toward the plane mirror 52. Further, the plane mirror 52 is disposed so as to guide a light beam from the plane mirror 51 to the photosensitive drum 8.

As shown in FIG. 1, the constituent components are disposed respectively in different positions with respect to the sub-scanning direction so that a light beam from the semiconductor laser 1 passes through the axial symmetric lens 2 and the cylindrical lens 3 to be incident on one of the deflection surfaces of the polygon mirror 5 obliquely relative to a plane that includes a normal line to the one of the deflection surfaces and is parallel to a main scanning direction, and so that a light beam from the polygon mirror 5 is incident on the curved surface mirror 7 obliquely relative to a YZ plane.

The curved surface mirror 7 is disposed in a space interposed between incident light L3 from the polygon mirror 5 that is to be incident on the plane mirror 51 and reflected light L4 from the plane mirror 51 to the plane mirror 52. Moreover, the curved surface mirror 7 is disposed in a space interposed among the incident light L3 to be incident on the plane mirror 51, the reflected light L4 from the plane mirror 51, and reflected light L5 from the plane mirror 52 to the photosensitive drum 8.

Next, the description is directed to specific numerical examples.

Figure 3:
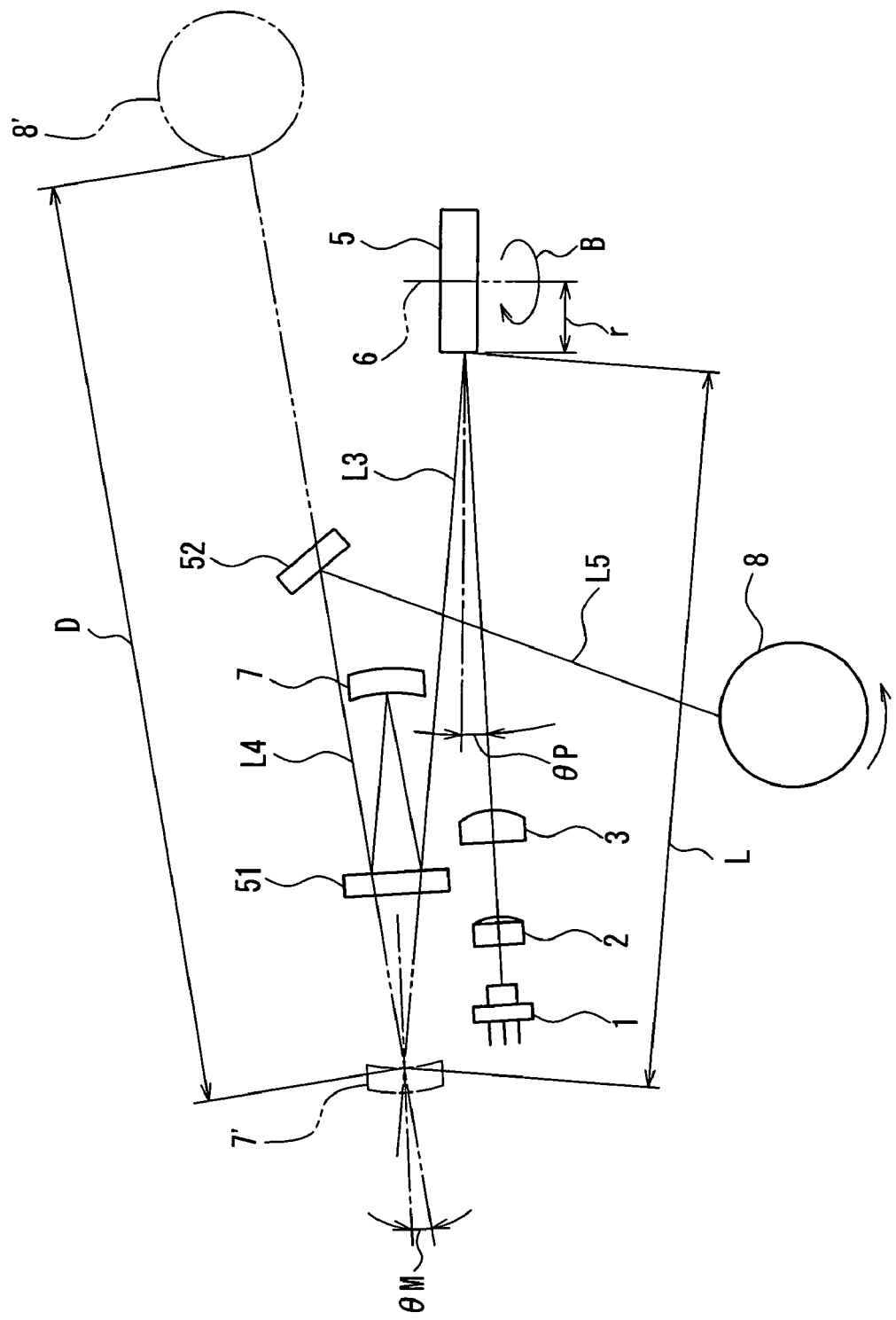
FIG. 3 is a diagram for explaining arrangements in the optical scanner according to Embodiment 1 of the present invention.

First, parameters are defined as follows. As shown in FIG. 3, reference character r denotes an inscribed radius of the polygon mirror 5. Further, reference character L denotes a distance between a deflection reflection point on the polygon mirror 5 and a curved surface mirror 7' in the case where, as indicated by a chain double-dashed line, the curved surface mirror 7 is disposed in the corresponding position of the curved surface mirror 7' shown in the figure on a light beam from the polygon mirror 5 without using the plane mirror 51. Similarly, reference character D denotes a distance between the curved surface mirror 7' and a photosensitive drum 8' in the case where the curved surface mirror 7 and the photosensitive drum 8 are disposed in the respective corresponding positions of the curved surface mirror 7' and the photosensitive drum 8' that are shown in the figure without using the plane mirrors 51 and 52. Reference character θP denotes an angle formed by a center axis of a light beam from the cylindrical lens 3 and a normal line to one of the deflection surfaces, and reference character θM denotes an angle formed by a center axis of a light beam from one of the deflection surfaces and the YZ plane.

Furthermore, in this example, when with respect to a vertex of a surface of the curved surface mirror as an origin, a sag amount from the vertex at a position defined by a coordinate x (mm) in the sub-scanning direction and a coordinate y (mm) in the main scanning direction is indicated as z (mm) where a direction in which an incident light beam travels is defined as a positive direction, the surface has a shape represented by an expression (4):

$$Z = f(y) + \frac{\frac{x^2}{g(y)} - 2x \cdot \sin\{\theta(y)\}}{\cos\{\theta(y)\} + \sqrt{\cos^2\{\theta(y)\} - \left(\frac{x}{g(y)}\right)^2 + \frac{2x \cdot \sin\{\theta(y)\}}{g(y)}}} \quad (4)$$

In the expression (4), f(y), g(y), and θ(y) are represented by expressions (5), (6), and (7), respectively.

$$f(y) = \frac{\left(\frac{y^2}{RDy}\right)}{1 + \sqrt{1 - (1+k)\left(\frac{y}{RDy}\right)^2}} + AD \cdot y^4 + AE \cdot y^6 + AF \cdot y^8 + AG \cdot y^{10} \quad (5)$$

$$g(y) = RDx(1 + BC \cdot y^2 + BD \cdot y^4 + BE \cdot y^6 + BF \cdot y^8 + BG \cdot y^{10}) \quad (6)$$

$$\theta(y) = EC \cdot y^2 + ED \cdot y^4 + EE \cdot y^6 \quad (7)$$

Herein, f(y) is an expression representing a non-circular arc shape that is a shape on a generatrix, g(y) is an expression representing a radius of curvature at a y-position in the sub-scanning direction (x-direction), and θ(y) is an expression representing a skew amount at a y-position. Further, RDy (mm) denotes a radius of curvature in the main scanning direction at the vertex, RDx (mm) denotes a radius of curvature in the sub-scanning direction, and k denotes a cone constant representing the shape of the generatrix. Further, AD, AE, AF and AG denote high-order constants representing the shape of the generatrix, BC, BD, BE, BF, and BG denote constants determining a radius of curvature in the sub-scanning direction at a y-position, and EC, ED, and EE denote skew constants determining a skew amount at a y position.

Herein, the orders of y are all even numbers, which indicates that the curved surface mirror 7 has a shape symmetrical with respect to an XZ plane. Further, the curved surface mirror 7 has a skew shape in which a normal line at each of points other than the vertex on the generatrix that is a curved line where the YZ plane intersects with the curved surface mirror 7 is not included in the YZ plane.

Specific numerical examples are shown in Tables 1 to 4 below. In the tables, a maximum image height is indicated as Ymax, and a polygon rotation angle corresponding to the maximum image height is indicated as αmax.

NUMERICAL EXAMPLE 1

TABLE 1

| Ymax | 165 | αmax | 12.0 | | |
|------|-----|------|------|---|---|
| θP | 5.0 | θM | 7.3 | | |
| L | 260.0 | D | 280.0 | r | 12.5 |
| RDy | −798.091 | RDx | −270.256 | | |
| K | 0.00000E−00 | BC | −2.1363E−06 | EC | −1.9803E−07 |
| AD | 1.3017E−10 | BD | −1.4520E−12 | ED | −2.3053E−13 |
| AE | −2.9837E−16 | BE | 6.9318E−18 | EE | −1.4246E−18 |
| AF | 0.00000E−00 | BF | −6.6726E−23 | | |
| AG | 0.00000E−00 | BG | 0.00000E−00 | | |

NUMERICAL EXAMPLE 2

TABLE 2

| Ymax | 165 | αmax | 12.0 | | |
|------|-----|------|------|---|---|
| θP | 5.0 | θM | 6.9 | | |
| L | 235.0 | D | 400.0 | r | 12.5 |
| Rdy | −681.059 | RDx | −296.709 | | |
| K | 0.00000E−00 | BC | −1.4968E−06 | EC | −2.0232E−07 |
| AD | 3.5335E−10 | BD | −2.5755E−12 | ED | −6.7273E−14 |
| AE | −1.6918E−15 | BE | 1.2543E−17 | EE | −1.9834E−18 |
| AF | 0.00000E−00 | BF | −1.0406E−22 | | |
| AG | 0.00000E−00 | BG | 0.00000E−00 | | |

NUMERICAL EXAMPLE 3

TABLE 3

| Ymax | 165 | αmax | 12.0 | | |
|---|---|---|---|---|---|
| θP | 5.0 | θM | 7.4 | | |
| L | 250.0 | D | 300.0 | r | 12.5 |
| RDy | −779.706 | RDx | −273.381 | | |
| K | 0.00000E−00 | BC | −1.9766E−06 | EC | −2.0737E−07 |
| AD | 1.6939E−10 | BD | −1.7436E−12 | ED | −1.8719E−13 |
| AE | 1.6344E−16 | BE | 9.1385E−18 | EE | −1.2529E−18 |
| AF | 0.00000E−00 | BF | −3.6269E−24 | | |
| AG | 0.00000E−00 | BG | 0.00000E−00 | | |

NUMERICAL EXAMPLE 4

TABLE 4

| Ymax | 165 | αmax | 12.0 | | |
|---|---|---|---|---|---|
| θP | 5.0 | θM | 8.2 | | |
| L | 235.0 | D | 290.0 | r | 12.5 |
| RDy | −808.421 | RDx | −260.376 | | |
| K | 0.00000E−00 | BC | −1.9268E−06 | EC | −2.4455E−07 |
| AD | 2.5557E−10 | BD | −1.9637E−12 | ED | −1.2203E−13 |
| AE | 2.2322E−15 | BE | 2.4845E−17 | EE | −1.5950E−19 |
| AF | 0.00000E−00 | BF | −1.4253E−22 | | |
| AG | 0.00000E−00 | BG | 0.00000E−00 | | |

The following description is directed to the operation of each of optical scanners having the above-mentioned configurations with reference to FIGS. 1 to 3.

A light beam from the semiconductor laser 1 is converted into converged light by the axial symmetric lens 2. Then, the light beam is converged only in the sub-scanning direction by the cylindrical lens 3, and is focused as a linear image on one of the deflection surfaces of the polygon mirror 5. The polygon mirror 5 rotates in a direction indicated by an arrow B around the rotation center axis 6, so that the light beam is scanned. Then, the light beam is reflected off the plane mirror 51, the curved surface mirror 7, the plane mirror 51, and the plane mirror 52 in this order to form an image on the surface 8 to be scanned. With respect to the shape of the curved surface mirror 7, a non-circular arc shape in the cross section in the main scanning direction and a radius of curvature in the sub-scanning direction corresponding to each image height are determined so that curvatures of field in the main and sub-scanning directions and an f-θ error are compensated, and moreover, an amount of a skew of the surface of the curved surface mirror 7 at a position corresponding to each image height is determined so that a curvature of a scanning line is compensated. Further, a portion of the light beam that has been deflected in a predetermined direction on a side slightly outer than a light beam scanning area on the surface 8 to be scanned is focused on a photodiode that is not shown by the curved surface mirror 7. Using a detection signal from the photodiode as a synchronizing signal, a controller that is not shown controls the semiconductor laser 1.

As described above, according to Embodiment 1 of the present invention, the plane mirror 51 is disposed so as to reflect incident light to be incident on the curved surface mirror 7 and reflected light from the curved surface mirror 7. Thus, even in the case where a light beam is reflected off the curved surface mirror 7 at a small reflection angle, a reduction of the size of a scanner can be achieved.

Furthermore, the second image forming optical system is configured of one curved surface mirror 7 alone, and the first image forming optical system, the polygon mirror 5, and the second image forming optical system 7 are disposed respectively in different positions in the sub-scanning direction.

Thus, a small-sized optical scanner that has a simple configuration and excellent optical performance with no wavelength dependency can be obtained.

Furthermore, the curved surface mirror 7 is formed in a shape symmetrical with respect to the XZ plane. This allows the curved surface mirror 7 to have a shape that provides relative ease of processing and measurement. Moreover, complete compatibility with the arrangement indicated by the chain double-dashed line shown in FIG. 3 can be maintained. That is, in the case where the plane mirror 51 is placed on an optical path extending from the polygon mirror 5 toward the curved surface mirror 7' indicated by the chain double-dashed line and on an optical path extending from the curved surface mirror 7' indicated by the chain double-dashed line toward the plane mirror 52, simply by disposing the curved surface mirror 7 in the position of a mirror image of the curved surface mirror 7' indicated by the chain double-dashed line, the arrangement shown in FIG. 1 can be obtained using the curved surface mirror 7 of the same shape as that of the curved surface mirror 7' without changing any other members. As a result of this, size reduction of an optical scanner can be achieved.

Furthermore, the plane mirror 51 reflects incident light to be incident on the curved surface mirror 7 and reflected light from the curved surface mirror 7 by using a common surface thereof, and thus a small-sized optical scanner can be obtained using a minimum number of components.

Figure 4:
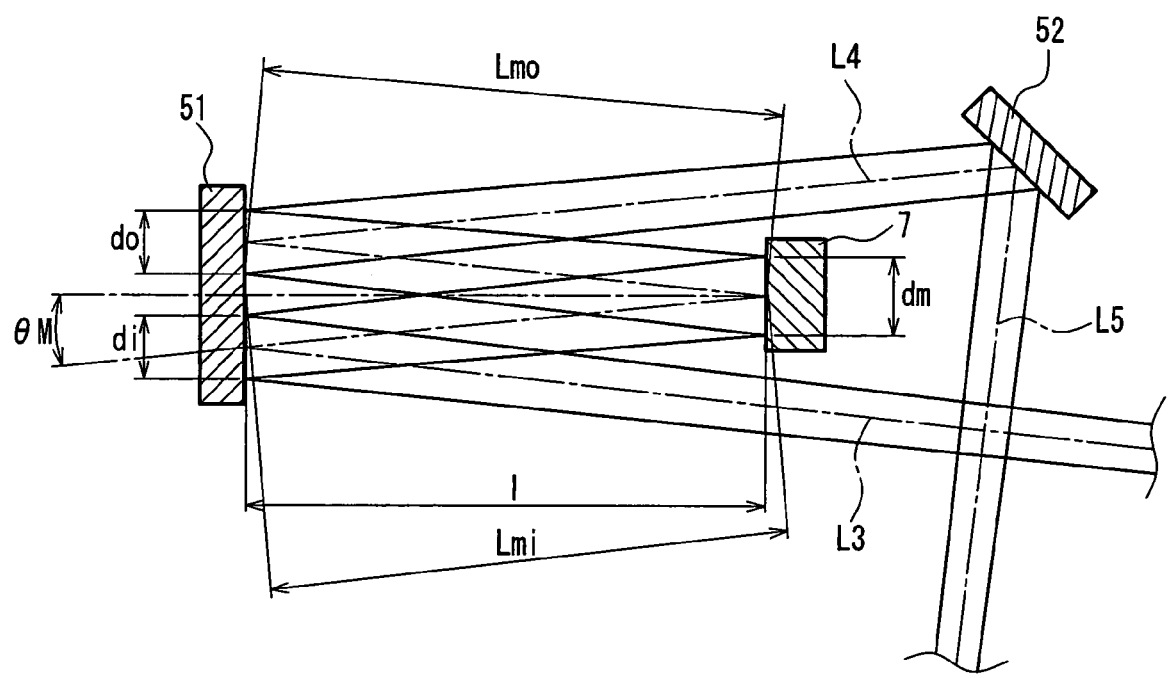
FIG. 4 is a cross-sectional view showing a configuration of a curved surface mirror and its vicinity in the optical scanner according to Embodiment 1 of the present invention, which is cut on the plane that includes the scanning center axis and is parallel to the sub-scanning direction.

Herein, as shown in FIG. 4, preferably, when a distance between the curved surface mirror 7 and the plane mirror 51 along a normal line at the vertex of the curved surface mirror 7 is indicated as l, an angle formed by a center axis of light to be incident on the curved surface mirror 7 and the YZ plane as θM, a width of a light beam on the curved surface mirror 7 in the sub-scanning direction as dm (mm), a width of the light to be incident on the curved surface mirror 7 on the plane mirror 51 in the sub-scanning direction as di (mm), and a width of reflected light from the curved surface mirror 7 on the plane mirror 51 in the sub-scanning direction as do (mm), the following conditional expression (1) is satisfied:

$$\frac{dm}{2} + 1 \leq 2l \tan \theta M \leq \frac{di}{2} + \frac{do}{2} + 2 \qquad (1)$$

Alternatively, when a distance between the curved surface mirror 7 and the plane mirror 51 along a center axis of light to be incident on the curved surface mirror 7 is indicated as Lmi (mm), a distance between the curved surface mirror 7 and the plane mirror 51 along a center axis of reflected light from the curved surface mirror 7 as Lmo (mm), a distance from one of the deflection surfaces of the polygon mirror 5 to the vertex of the curved surface mirror 7 as L (mm), and a distance from the vertex of the curved surface mirror 7 to the photosensitive drum 8 as D (mm), di and do in the above-mentioned expression (1) may be approximated by the following expressions (2) and (3), respectively:

$$di = dm \times \frac{L - Lmi}{L} \qquad (2)$$

$$do = dm \times \frac{D - Lmo}{D} \qquad (3)$$

With a value of 2l tan θM lower than the lower limit value given by the expression (1), undesirably, the curved surface mirror 7 interrupts the incident light L3 or the reflected light L4. Further, with a value of 2l tan θM higher than the upper limit value given by the expression (1), undesirably, the plane mirror 51 has an increased width in the sub-scanning direction. In other words, when 2l tan θM has a value not higher than the upper limit value given by the expression (1), significant advantages of the plane mirror 51 formed of one small-sized mirror are attained. As a result, the number of components can be reduced, and adjustment of the optical systems can be facilitated.

Furthermore, the curved surface mirror 7 is disposed in a space interposed between the incident light L3 to be incident on the plane mirror 51 and the reflected light L4 from the plane mirror 51. Thus, space that has been considered useless in the case of the arrangement indicated by the chain double-dashed line in FIG. 3 can be utilized effectively, thereby allowing a small-sized optical scanner to be obtained.

Furthermore, the curved surface mirror 7 is disposed in a space interposed among the incident light L3 to be incident on the plane mirror 51, the reflected light L4 from the plane mirror 51, and the reflected light L5 from the plane mirror 52. Thus, space can be utilized more effectively, and a small-sized optical scanner can be obtained.

Moreover, by the above-mentioned configuration, the polygon mirror 5, the curved surface mirror 7, the plane mirror 51, and the plane mirror 52 can be disposed closely to each other. Thus, as well as size reduction of an optical scanner, higher rigidity of fixed parts of the above-mentioned optical elements can be achieved, thereby allowing an optical scanner that exhibits high stability with respect to a vibration and a temperature change to be obtained.

Furthermore, the curved surface mirror 7 has a shape that permits compensation of a curve of a scanning line that occurs due to oblique light incidence. Thus, optical systems can be formed so as to have simple configurations, and while ray aberration that occurs due to oblique incidence of a light beam can be compensated, a curve of a scanning line also can be compensated.

Furthermore, the curved surface mirror 7 has a skew shape in which a normal line at each of the points other than the vertex on the generatrix that is a curved line where the surface of the curved surface mirror 7 intersects with the YZ plane is not included in the YZ plane. Thus, optical systems can be formed so as to have simple configurations, and while ray aberration that occurs due to oblique incidence of a light beam can be compensated, a curve of a scanning line also can be compensated.

Furthermore, this embodiment used the curved surface mirror 7 that is represented by the expression (4). Thus, even when the plane mirror 51 vibrates, less influence is caused by the vibration, thereby allowing an excellent image to be obtained.

In this embodiment, the expression (4) was used to represent the shape of the curved surface mirror 7. However, other expressions also may be used as long as the expressions can represent the same shape.

Moreover, in the curved surface mirror 7, an angle formed by a normal line at each of the points on the generatrix and the YZ plane should be increased toward the periphery of the curved surface mirror 7. Further, an angle formed by a normal line at each of the points on the generatrix with respect to the YZ plane should be in a positive direction where a direction of an angle that a light beam reflected off the curved surface mirror 7 forms with respect to an incident light beam from the polygon mirror 5 is defined as the positive direction.

Figure 6:
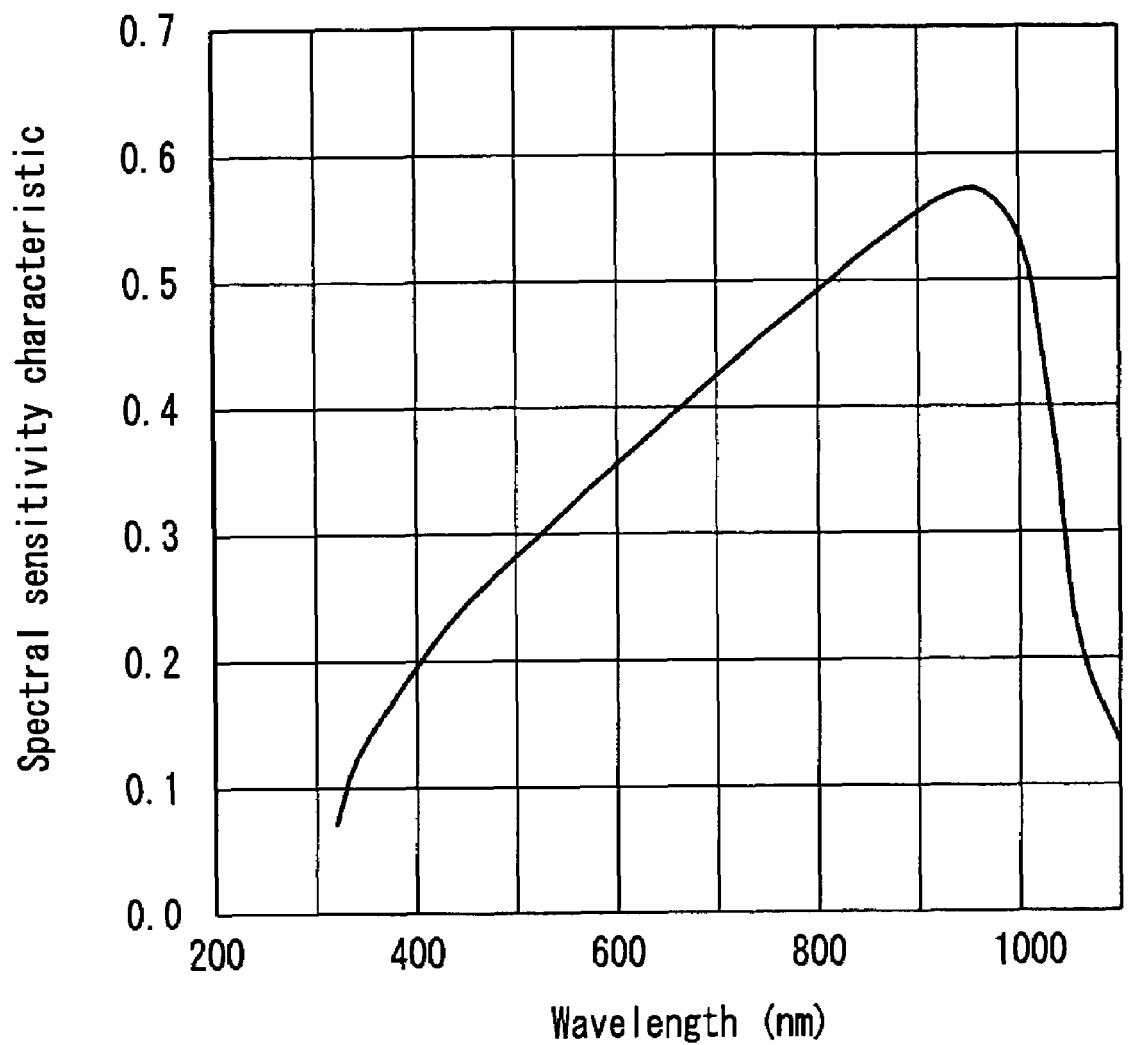
FIG. 6 is a characteristic diagram showing spectral sensitivity of a photodiode as a representative example.
Figure 7:
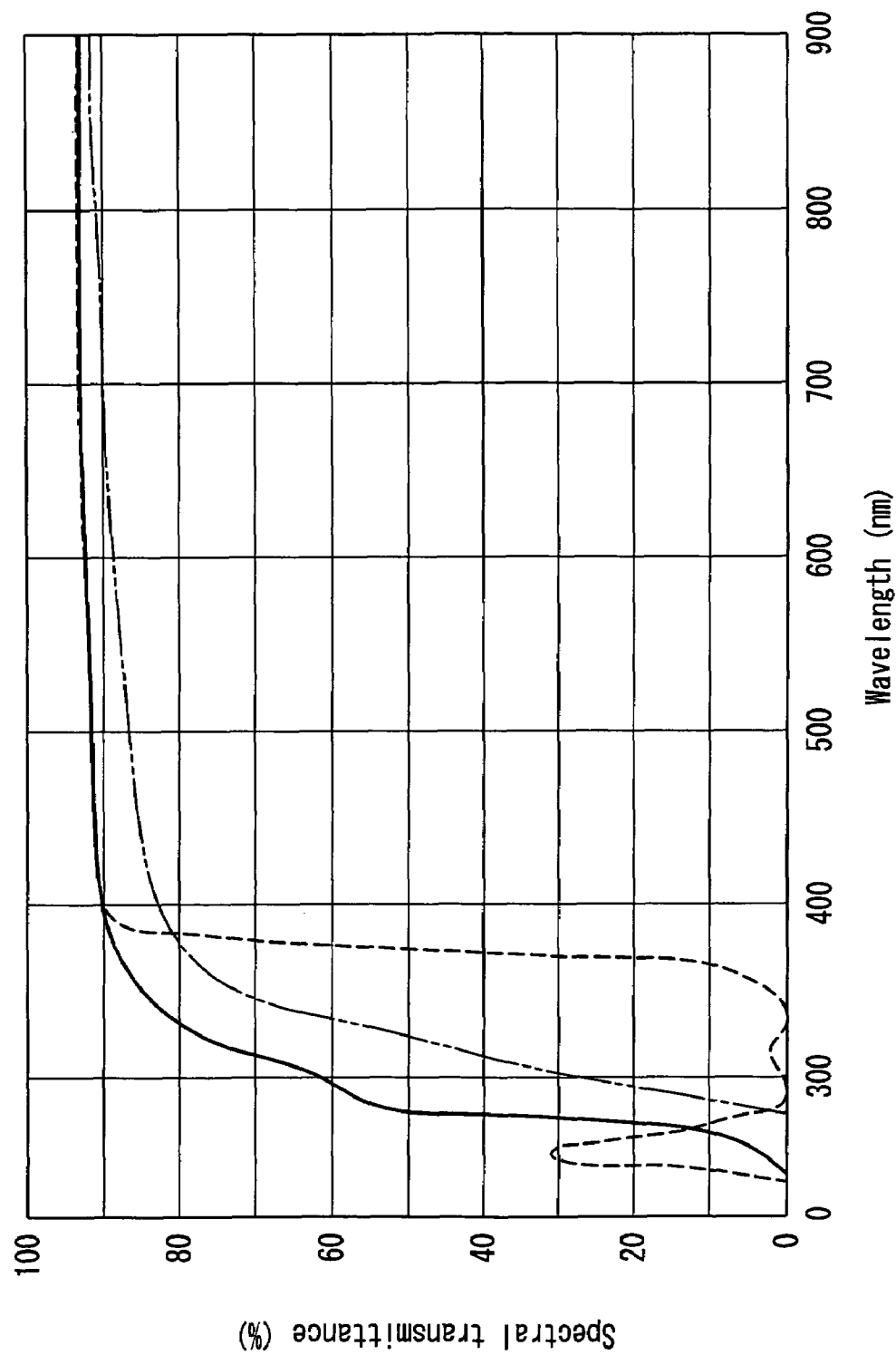
FIG. 7 is a characteristic diagram showing spectral transmittances of materials of three types of resin lenses as representative examples.

Furthermore, in this embodiment, a light source for emitting a light beam having a wavelength of 500 nm or shorter can be used. FIG. 6 is a characteristic diagram showing spectral sensitivity of a photodiode as a representative example. FIG. 7 is a characteristic diagram showing spectral transmittances of materials of three types of resin lenses as representative examples. With respect to light beams in a region of a wavelength of 500 nm or shorter, as shown in FIG. 6, the spectral sensitivity of the photodiode decreases to about half the value obtained with respect to a commonly used wavelength of 780 nm. Moreover, in this case, as shown in FIG. 7, when using a plurality of resin lenses, due to the respective spectral transmittances of the lenses, the power of a light beam is attenuated, and thus the light beam hardly can be detected by the photodiode. According to the optical scanner of the present invention, a detecting optical system that guides and condenses a light beam onto a photodiode is configured of one curved surface mirror 7 alone. Thus, a reflectance of the mirror 7 as high as 95% or higher can be achieved, thereby facilitating detection of a reference signal even in the case of using a light source for emitting light having a short wavelength.

EMBODIMENT 2

Figure 5:
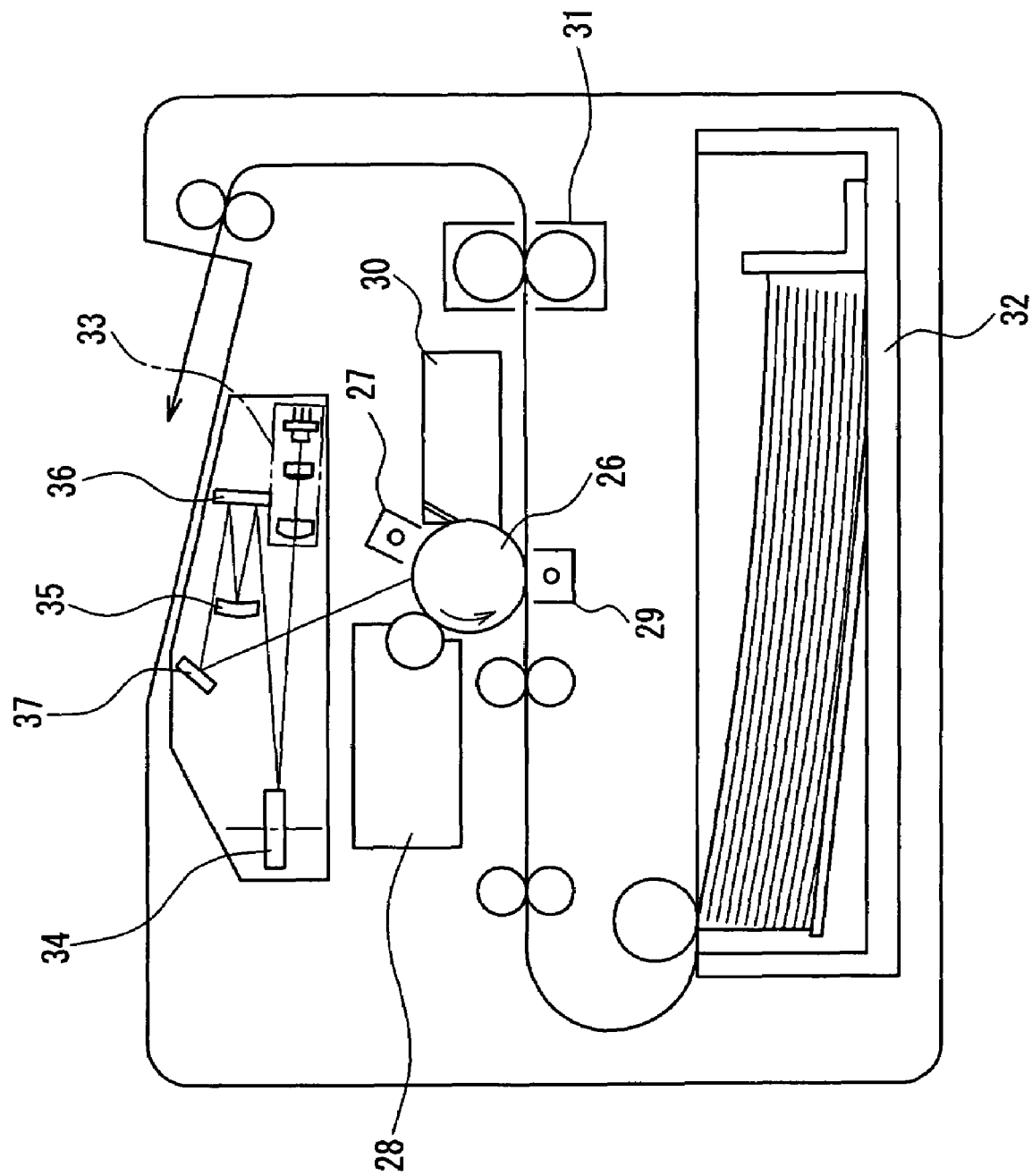
FIG. 5 is a schematic cross-sectional view of an image forming apparatus according to Embodiment 2 to which the optical scanner according to the present invention is applied.

FIG. 5 is a schematic cross-sectional view showing an embodiment of an image forming apparatus to which the optical scanner described with regard to Embodiment 1 is applied. In FIG. 5, reference numeral 26 denotes a photosensitive drum that includes a surface to be scanned coated with a photosensitive material whose electric charge changes under light irradiation, and reference numeral 27 denotes a primary charger that allows electrostatic ions to adhere to a surface of the photosensitive material so that the surface is charged. Further, reference numeral 28 denotes a developer that allows charged toner to adhere selectively to the photosensitive material, and reference numeral 29 denotes a transferring charger that transfers the toner that has been adhered thereto to a paper sheet. Reference numerals 30, 31, and 32 denote a cleaner that removes a residue of the toner, a fixing unit that fixes the transferred toner on the paper sheet, and a paper-feeding cassette, respectively. Reference numeral 33 denotes a light source block that is composed of a semiconductor laser as a light source part and a first image forming optical system configured of an axial symmetric lens and a cylindrical lens. Reference numerals 34, 35, 36, and 37 denote a polygon mirror as an optical deflector, a curved surface mirror that is the first reflecting optical element described with regard to Embodiment 1, a plane mirror that is a second reflecting optical element, and a plane mirror that is a third reflecting optical element, respectively.

As described above, according to Embodiment 2, the above-mentioned optical scanner according to Embodiment 1 is used, and thus a small-sized image forming apparatus can be realized even in the case of using a curved surface mirror as an optical element.

Furthermore, if a configuration in which a light beam from the light source block 33 is bent at a bending mirror (not shown) and then is incident on the polygon mirror 34 is employed, a further reduction in size can be achieved.

The embodiments disclosed in this application are intended to illustrate the technical aspects of the invention and not to limit the invention thereto. The invention may be embodied in other forms without departing from the spirit and the scope of the invention as indicated by the appended claims and is to be broadly construed.

The invention claimed is:

1. An optical scanner, comprising:
first and second reflecting optical elements,
wherein the second reflecting optical element is disposed so as to reflect incident light to be incident on the first reflecting optical element and reflected light from the first reflecting optical element,
wherein the second reflecting optical element reflects the incident light to be incident on the first reflecting optical element and the reflected light from the first reflecting optical element by using a common surface of the second reflecting optical element, and
wherein the first reflecting optical element is formed of a curved surface mirror, and when a distance between the first reflecting optical element and the second reflecting optical element along a normal line at a vertex of the curved surface mirror is indicated as l, an angle formed by a center axis of incident light to be incident on the first reflecting optical element and a plane that includes the normal line at the vertex of the curved surface mirror and is parallel to a main scanning direction as θM, a width of the incident light on the first reflecting optical element in a sub-scanning direction as dm, a width of the incident light to be incident an the first reflecting optical element on the second reflecting optical element in the sub-scanning direction as di, and a width of reflected light from the first reflecting optical element on the second reflecting optical element in the sub-scanning direction as do, the following conditional expression (1) is satisfied:

$$\frac{dm}{2} + 1 \le 2l \tan \theta M \le \frac{di}{2} + \frac{do}{2} + 2. \quad (1)$$

2. The optical scanner according to claim 1, further comprising:
a first image forming optical system that is disposed between the light source part and the optical deflector and allows a linear image to be formed on a deflection surface of the optical deflector,
wherein the first reflecting optical element is formed of a curved surface mirror, and is disposed between the optical deflector and a surface to be scanned and constitutes a second image forming optical system, and
the first image forming optical system, the optical deflector, and the second image forming optical system are disposed respectively in different positions in a sub-scanning direction so that a light beam from the first image forming optical system is incident obliquely relative to a plane that includes a normal line to the deflection surface of the optical deflector and is parallel to a main scanning direction, and so that a light beam from the optical deflector is incident obliquely relative to a plane tint includes a normal line at a vertex of the curved surface mirror and is parallel to the main scanning direction (hereinafter, referred to as a "YZ plane").

3. The optical scanner according to claim 1,
wherein the first reflecting optical element is formed of a curved surface mirror, and the curved surface mirror has a shape symmetrical with respect to a plane that includes a normal line at a vertex of the curved surface mirror and is perpendicular to a main scanning direction (hereinafter, referred to as an "XZ plane").

4. The optical scanner according to claim 1,
wherein the second reflecting optical element reflects a light beam reflected from the optical deflector and a light beam reflected from the first reflecting optical element by using a common surface of the second reflecting optical element.

5. The optical scanner according to claim 2,
wherein the flint reflecting optical element has a shape that permits compensation for a curve of a scanning line that occurs due to oblique light incidence.

6. The optical scanner according to claim 2,
wherein the curved surface mirror has a skew shape in which a normal line at each of points other than die vertex on a generatrix that is a curved line where a surface of the curved surface mirror intersects with the YZ plane is not included in the YZ plane.

7. The optical scanner according to claim 1,
wherein the first reflecting optical element is disposed in a space interposed between a light beam reflected from the optical deflector to be incident on the second reflecting optical element and a light beam reflected last from the second reflecting optical element.

8. The optical scanner according to claim 1, further comprising:
a third reflecting optical element that reflects a light beam reflected last from the second reflecting optical element,
wherein the first reflecting optical element is disposed in a space bounded by the second reflecting optical element, a light beam reflected from the optical deflector to be incident on the second reflecting optical element, the light bean reflected last from the second reflecting optical element to be incident on the third reflecting optical element, and a light beam reflected from the third reflecting optical element.

9. An image forming apparatus comprising an optical scanner as claimed in claim 1.

10. An optical scanner, comprising:
first and second reflecting optical elements,
wherein the second reflecting optical element is disposed so as to reflect incident light to be incident on the first reflecting optical element and reflected light from the first reflecting optical element,
wherein the second reflecting optical element reflects the incident light to be incident on the first reflecting optical element and the reflected light from the first reflecting optical element by using a common surface of the second reflecting optical element, and
wherein the first reflecting optical element is formed of a curved surface mirror, and when a distance between the first reflecting optical element and the second reflecting optical element along a normal line at a vertex of the curved surface mirror is indicated as l, a distance between the first reflecting optical element and the second reflecting optical element along a center axis of incident light to be incident on the first reflecting optical element as Lmi, a distance between the first reflecting optical element and the second reflecting optical element along a center axis of reflected light from the first reflecting optical element as Lmo, an angle formed by the center axis of the incident light to be incident on the first reflecting optical element and a plane that includes the normal line at the vertex of the curved surface mirror and is parallel to a main scanning direction as θM, a width of the incident light on the first reflecting optical element in a sub-scanning direction as dm, a distance from a deflection surface of the optical deflector to a vertex of the first reflecting optical element as L, and a distance from the vertex of the first reflecting optical element to a surface to be scanned as D, the following conditional expression (1) is satisfied:

$$\frac{dm}{2} + 1 \leq 2l\tan\theta M \leq \frac{di}{2} + \frac{do}{2} + 2 \quad (1)$$

where di and do are approximated by the following expressions (2) and (3), respectively:

$$di = dm \times \frac{L - Lmi}{L} \quad (2)$$

$$do = dm \times \frac{D - Lmo}{D}. \quad (3)$$

11. The optical scanner according to claim 10, further comprising:

a first image forming optical system that is disposed between the light source part and the optical deflector and allows a linear image to be formed on a deflection surface of the optical deflector, wherein the first reflecting optical element is formed of a curved surface mirror, and is disposed between the optical deflector and a surface to be scanned and constitutes a second image forming optical system, and the first image forming optical system, the optical deflector, and the second image forming optical system are disposed respectively in different positions in a sub-scanning direction so that a light beam from the first image forming optical system is incident obliquely relative to a plane that includes a normal line to the deflection surface of the optical deflector and is parallel to a main scanning direction, and so that a light beam from the optical deflector is incident obliquely relative to a plane that includes a normal line at a vertex of the curved surface mirror and is parallel to the main scanning direction (hereinafter, referred to as a "YZ plane").

12. The optical scanner according to claim 11,
wherein the first reflecting optical element has a shape that permits compensation for a curve of a scanning line that occurs due to oblique light incidence.

13. The optical scanner according to claim 11,
wherein the curved surface mirror has a skew shape in which a normal line at each of points other than the vertex on a generatrix that is a curved line where a surface of the curved surface mirror intersects with the YZ plane is not included in the YZ plane.

14. The optical scanner according to claim 10,
wherein the first reflecting optical element is formed of a curved surface mirror, and the curved surface mirror has a shape symmetrical with respect to a plane that includes a normal line at a vertex of the curved surface mirror and is perpendicular to a main scanning direction (hereinafter, referred to as an "XZ plane").

15. The optical scanner according to claim 10,
wherein the second reflecting optical element reflects a light beam reflected from the optical deflector and a light beam reflected from the first reflecting optical element by using a common surface of the second reflecting optical element.

16. The optical scanner according to claim 10,
wherein the first reflecting optical element is disposed in a space interposed between a light beam reflected from the optical deflector to be incident on the second reflecting optical element and a light beam reflected last from the second reflecting optical element.

17. The optical scanner according to claim 10, further comprising:

a third reflecting optical element that reflects a light beam reflected last from the second reflecting optical element, wherein the first reflecting optical element is disposed in a space bounded by the second reflecting optical element, a light beam reflected from the optical deflector to be incident on the second reflecting optical element, the light beam reflected last from the second reflecting optical element to be incident on the third reflecting optical element, and a light beam reflected from the third reflecting optical element.

18. An image forming apparatus comprising an optical scanner as claimed in claim 10.

* * * * *